United States Patent [19]

Mauch et al.

[11] 4,056,757

[45] Nov. 1, 1977

[54] EMERGENCY LIGHTING SYSTEM

[75] Inventors: Robert E. Mauch; Robert I. Sarbacher, both of Santa Monica, Calif.

[73] Assignee: John C. Bogue, Santa Monica, Calif.

[21] Appl. No.: 231,220

[22] Filed: Mar. 2, 1972

[51] Int. Cl.$^2$ .......................................... H05B 37/00
[52] U.S. Cl. ........................................ 315/86; 307/64
[58] Field of Search ................... 315/86, 87, 160, 171, 315/174, 175; 307/64, 66, 23; 336/155, 160, 165; 313/147

[56] References Cited

U.S. PATENT DOCUMENTS

| | | | |
|---|---|---|---|
| 1,738,206 | 12/1929 | Riddles | 315/87 |
| 2,476,517 | 7/1949 | Titus | 315/87 |
| 2,534,542 | 12/1950 | Bower | 307/64 |
| 2,590,611 | 3/1952 | Gunter | 315/86 X |
| 2,681,429 | 7/1954 | Long | 307/73 |
| 3,172,017 | 3/1965 | Moakler | 317/174 |
| 3,373,313 | 3/1968 | Prines et al. | 307/73 X |
| 3,660,714 | 5/1972 | Chandler | 315/86 |

Primary Examiner—John K. Corbin
Assistant Examiner—R. A. Rosenberger
Attorney, Agent, or Firm—Witherspoon, Lane & Hargest

[57] ABSTRACT

A system which will provide emergency lighting as desired when the normal power supply such as the utility power is interrupted or otherwise not available. The system provides the emergency power by means of the same wiring that is used to provide the utility power to the lights. In addition, the "on-off" switch or switches used to control the turning on and off of the lights when the utility power is available also provides control of the lights when the emergency supply is being utilized.

10 Claims, 1 Drawing Figure

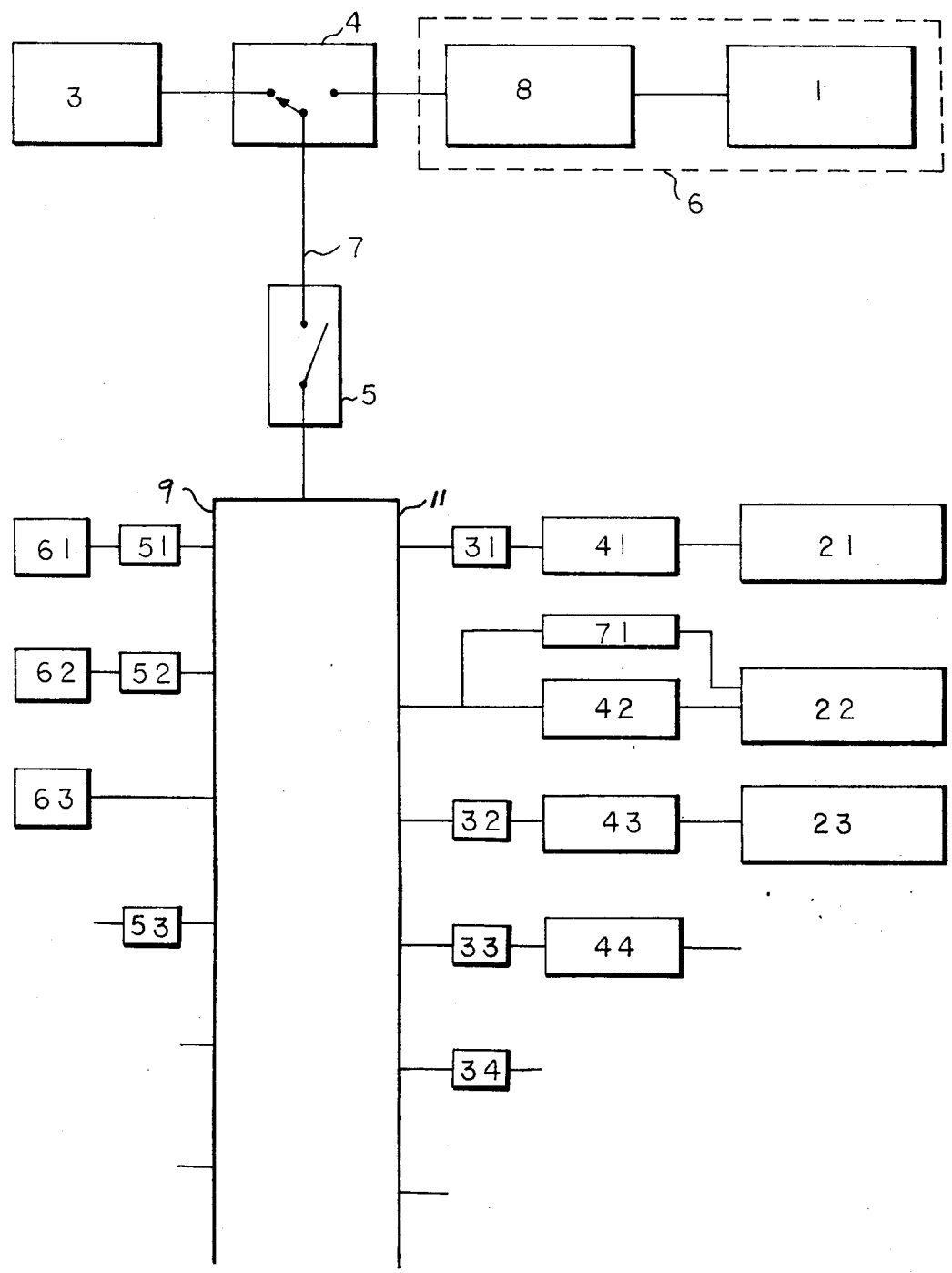

EMERGENCY LIGHTING SYSTEM

BACKGROUND OF THE INVENTION

This invention relates generally to power supplies for lighting systems; and, more particularly, to a system that will provide emergency operation of a lighting system when power is not available from the normal power supply. Emergency power lighting systems are well known in the art. These prior art systems utilize, for emergency power, various combinations of primary batteries, secondary batteries, electric generators and/or other comon sources of power. Some systems use one source exclusively, while others use various combinations of several power sources. However, common to a majority of these systems is the fact that the form in which the emergency power is available from the source is not the form which is suitable for the end use (i.e., batteries supply low voltage D.C., fluorescent lamps prefer high voltage A.C.). For this reason nearly all emergency lighting systems employ some type of inverter (usually a solid state inverter) to convert the available power to the preferred form.

In the prior art systems two basic approaches have been utilized. In one of these basic approaches, all components of the system, including the batteries, are located in or near the light fixture. In these systems the components are operating in a hostile environment. The most significant degrading factor being the well known sensitivity of batteries to heat.

In addition to the heat problem, other problems are encountered with these systems. Additional wiring other than that needed to operate from the utility power is required. This additional wiring is expensive and may be inconvenient to provide. The components of the system are generally inaccessible for servicing. The inaccessibility for service contributes to reducing the life expectancy and reliability. Also, during emergency operation the lamps are not controlled by the normal "on-off" switch and if the system is not properly installed, localized failures can cause the lights to be out in one part of the building without the emergency system recognizing that a failure has occurred. This inability to recoginze a power failure can occur if the battery charging supply is not connected to the same branch circuit as the normal supply for the fixture; the branch circuit may fail, thus cutting off the lights while the emergency apparatus is still receiving power from a different branch circuit. Under these circumstances, emergency power will not be supplied to the branch that has lost normal power.

The fact that the lights are not controlled by the normal "on-off" switch during emergency power is more than just an inconvenience. It is conceivable that one can have a power failure when no light is needed or wanted, this type emergency system will nevertheless turn on the lights and exhaust the emergency power supply unnecessarily; in addition, the turning on of the lights may under certain circumstances be detrimental (i.e., a photographic dark room).

In the other basic approach utilized, all the components are located remote from the light fixtures and separate wiring is used to provide the emergency power to the light fixtures. While this approach does not suffer from the heat problem and generally inaccessibility problem as is the case with the approach where all the components are located in or near the light fixtures, it also has certain inherent undesirable features. For example, these systems require wiring in addition to the wiring used to carry normal utility power to the lamps. The normal wiring is not used in these systems; therefore, separate additional wiring must be provided. This additional wiring adds considerably to the expense of the system and is inconvenient to install, particularly in existing buildings. Also, separate "on-off" switches connected in the emergency wiring must be provided if automatic turn on of the lights during emergency operation is to be avoided. The normal "on-off" switches that control the application of utility power do not control the emergency system. The provision of additional switches adds appreciably to the expense of the system and may be inconvenient to install, particularly in existing buildings.

The emergency system of this invention does not require additional wiring and overcomes many of the other problems encountered with the prior art systems.

SUMMARY OF THE INVENTION

The emergency lighting system of this invention provides emergency power to the lights over the same basic wiring that is utilized to provide normal utility power. A switch connected in the normal wiring system is closed on the utility power supply as long as the utility power is available. When the utility power fails, the switch automatically opens off the utility supply and closes on the emergency power supply, thereby providing emergency power to the lights via the normal wiring. The emergency supply may consist of any combination of batteries and/or generators and the inverters desired which will provide the required emergency power. The inverters raise the frequency of the emergency power to a frequency higher than that of the utility supply. If the lighting system contains fluorescent lamps, special ballasts that will operate on this higher frequency are used. In this manner a selected number of lights rather than all the lights can be placed in operation during emergency operation, thereby conserving power. In addition, high frequency disconnects can be provided in series with the conventional ballasts to assure that some of the lights will not turn on during emergency operation. If the lighting system includes in addition to the fluorescent lights, incandescent lights, or consists only of incandescent lights, the frequency sensitive disconnects can be connected to a selected number of the incandescent lights so that a number less than all the lights will be turned on during emergency operation.

DESCRIPTION OF THE DRAWING

A complete understanding of the invention can be obtained from the following detailed description when read in conjunction with the annexed drawing in which the single FIGURE shows a block diagram of an emergency lighting system embodying the principles of this invention.

DETAILED DESCRIPTION OF THE INVENTION

Referring to the drawing, the single Figure shows a generalized form of the lighting system constructed in accordance with this invention. In the Figure, block 3 represents the normal utility power source. As utilized for lighting, source 3 is generally a 110 volt, 60 cycle source. The dotted box 6 represents the emergency power supply. A transfer switch 4 is shown closed on utility power source 3. Transfer switch 4 also has a contact connected to emergency power supply 6. The switch arm of transfer switch 4 is connected to an "on-off" switch 5 by means of line 7.

The lighting system shown in the FIGURE, comprises a plurality of fluorescent lamps represented by the blocks 21, 22 and 23. While only three such lights are specifically shown, anynumber of lights could be provided as indicated in the FIGURE. In addition to the fluorescent lights, the system also includes incandescent lights as represented by the blocks 61, 62 and 63. As was the case with the fluorescent lights, the system may include more than the three incandescent lamps 61, 62 and 63 specifically shown as is indicated in the FIGURE.

Each of the fluorescent lights 21, 22 and 23 is provided with a conventional ballast as is indicated by the blocks 41, 42 and 43, respectively. The block 44 also represents a ballast which would be provided for a fourth fluorescent light not shown. Of course, any additional fluorescent light would also be provided with such a ballast.

Fluorescent lights 21, 22 and 23 are coupled to the power line 11 through their respective ballasts. Incandescent lamps 61, 62 and 63 are coupled to the power line 9. Power lines 9 and 11 are connected to the arm of "on-off" switch 5. Switch 5 is the normal wall switch used in lighting systems to turn the lights on and off. While only one such "on-off" switch is shown, it is obvious that each lamp could be controlled by a separate switch, or the fluorescent lamps and incandescent lamps could be turned on and off by separate independent switches or various other switch combinations could be provided. This will, of course, be apparent to one skilled in the art since most buildings have more than one light switch for turning various lights or combinations of lights on off. Furthermore, the manner in which the switches are connected to the lamps is well known in the art.

With the exception of transfer switch 4, the system thus far described including the wiring is a typical building lighting system. With transfer switch 4 in the position shown in the FIGURE, the closing of switch 5 will turn on fluorescent lights 21, 22 and 23 and incandescent lamps 61, 62 and 63. It should be mentioned at this point that the elements represented by the blocks 31, 32 33, 34, 51, 52 and 53 and the element represented by the block 71, all of which will be explained later, have no effect on the operation of the lamps as long as power is being supplied by utility power source 3.

As was mentioned above, the dotted box 6 represents the emergency power supply. This power supply may consist of any combination of batteries and/or generators and inverters desired which will supply the required emergency power. In the FIGURE, the block 1 represents batteries and the block 8 represents an inverter which converts the DC battery voltage to the AC voltage required.

While not shown in the FIGURE, it is customary in emergency systems utilizing batteries to provide charging of the batteries from the utility power source. In the system shown all that would be required is a battery charging circuit connected between power source 3 and the batteries. Any suitable conventional battery charging system could be utilized. The manner in which such a charging system would be connected and operated in the circuitry of the FIGURE is so well known in the art that the showing of such a system is not considered necessary. One would merely connect the battery charging system directly between source 3 and batteries 1.

If power source 3 should for any reason fail, transfer switch 4 would open off of power source 3 and close on emergency supply 6. Of course, batteries 1 would no longer receive a charging current if a charging circuit is provided and power source 3 fails.

When transfer switch 4 is closed on emergency supply 6, the emergency supply is used to provide power to the lights. When operating on emergency power, power can be conserved by only operating some of the lights rather than all of the lights. This selectivity of lights that are to be operated from emergency supply 6 is accomplished in this invention by having power supply 6 provide an AC voltage that has a frequency considerably higher than the frequency of utility power source 3 and by providing circuitry that will permit selectivity in response to this relatively high frequency.

Assuming switch 5 is closed then as shown in the FIGURE only fluorescent lamp 22 and incandescent lamp 63 will be operated by emergency supply 6. Inverter 8 of emergency supply 6 is one that will provide power at a frequency that is five or more times higher than the frequency of utility power source 3. Thus, if power source 3 is a typical 60 Hertz supply, emergency supply 6 is a power source having a frequency of 300 Hertz or higher. At this higher frequency the conventional ballasts 41, 42, 43, and 44 do not permit the available high frequency power to reach their respective lamps, since they are commonly inductances and present a high impedance to this high frequency power. Frequency sensitive disconnect circuits represented by the blocks 31, 32, 33 and 34 may also be provided if the ballasts do not present a sufficiently high impedance. These frequency sensitive disconnect circuits are conventional frequency sensitive switches that will open the circuit to their respective lights in response to the high frequency output from emergency supply 6. Thus, in the FIGURE fluorescent lights 21 and 23 and any lights coupled to disconnects 33 and 34 will not be operated by the emergency power. Nor in all probability will fluorescent light 22 be turned on through its normal ballast 42. In order that operation of fluorescent light 22 is assured when switch 5 is closed during emergency operation, a special ballast represented by the block 71 is connected across normal ballast 42. Ballast 71 is designed to operate at the higher frequency of the emergency power supply 6. Such ballasts are available on the market today. Thus, fluorescent light 22 will be turned on through ballast 71 when switch 5 is closed and will of course be turned off when switch 5 is opened since emergency power supply 6 is coupled to the lights through switch 5 as is utility power source 3. Any fluorescent light in the system that is provided with a ballast such as ballast 71 will, of course, be operated by emergency supply 6. Thus, those fluorescent lights that are to be operated during emergency conditions are provided with an additional ballast and those fluorescents that are not to be operated at that time are not provided with this additional ballast and in addition a frequency sensitive disconnect may be provided with each of these lights to assure that they will not be operated by the emergency power.

Incandescent lights, of course, do not use ballast. Therefore, the incandescent lights would normally be turned on by the high frequency emergency power. Those incandescent lights that are not to be operated by the emergency power are provided with frequency sensitive disconnects identical to the disconnects provided with the fluorescent lights. In the FIGURE these disconnects are represented by the blocks 51, 52 and 53. In the FIGURE then, incandescent lights 61 and 62 and the incandescent light connected to disconnect 53 will not be operated during emergency conditions. Of the incandescent lights specifically shown, only incandescent light 63 will be turned on when switch 5 is closed during emergency operation. Thus, in the case of incandescent lights, those lights that are to remain off during emergency operation are provided with frequency sensitive disconnects.

From the foregoing description it should be obvious that the emergency power supply system of this invention overcomes many of the problems of the prior art systems. For example, no additional wiring is required; the emergency power is applied to the lights through the same switches and wiring that are used with the utility power source and the power supply components of the system are located remote from the lights and therefore not subjected to the heat given off by the lights. Furthermore, the system can be installed in an existing building very readily.

While the invention has been described with reference to a particular lighting system, it should be obvious that the invention can be incorporated into any lighting system to provide emergency lighting. The system can be used anywhere there are lights (i.e., stairwells, exit lights, elevators, etc.) Also, the fact that specific voltage and frequencies have been used to describe the invention is not to be considered limiting. The invention can be incorporated into any lighting system. The frequency and voltage of the emergency power supply need merely be designed to accommodate the system in which the invention is utilized. In addition, if several branch lighting circuits eminate from power source 3, each such branch would include a transfer switch such as switch 4 so that interruption of utility power to a particular branch will be recongized by the sytem. Each such transfer switch would have one contact connected to the emergency power supply or separate emergency power supplies could be provided for each branch if the power requirements so dictate. If a single emergency supply is used with such a multibranch arrangement and a charging circuit is provided, the charging circuit will have to be so designed that proper emergency power supply operation is provided when utility power is interrupted to one or more but not all of the branches. The techniques for providing such a charging system are well known in the art.

While it has been mentioned above, it is again pointed out that emergency power supply 6 can be composed of primary batteries, secondary batteries and/or generators and other well known sources of power. Any one of these sources or any combination of them can be used. Thus while the block labeled 1 has been specifically described as being a battery, it could just as well be some other source. Also, if an AC generator or generators are used, inverter 8 would not be needed. Instead of an inverter, block 8 could represent a frequency multiplier if the frequency of the generators was not sufficiently high. Furthermore, it will be obvious to those skilled in the art that various modifications and changes can be made to the specific system shown and described without departing from the spirit and scope of the invention as described in the claims.

What is claimed is:

1. In combination with a lighting system comprising an alternating current utility power source, an "on-off" switch and a plurality of fluorescent lights coupled to said utility power source through said "on-off" switch, each one of said plurality of fluorescent lights being provided with a ballast, an emergency system comprising:

an emergency power supply having a frequency higher than the frequency of said utility power source;
   a transfer switch having a first contact directly connected to said utility power source, a second contact connected to said emergency power supply and a switch arm connected to said "on-off" switch, said transfer switch being so arranged that said switch arm is closed on said first contact when power is available from said utility power source and is automatically transferred from said first contact to said second contact when power is not available from said utility power source whereby power for illuminating said plurality of fluorescent lights is provided by said emergency power supply through said "on-off" switch when power is not available from said utility power source; and
   means for illuminating one or more but not all of said plurality of fluorescent lights when power for illuminating said plurality of fluorescent lights is provided by said emergency power supply, said ballast provided with each one of said plurality of fluorescent lights presenting such a high impedance to said higher frequency power from said emergency power supply that each one of said plurality of fluorescent lights cannot be effectively illuminated from said higher frequency emergency power supply through its respective said ballast.

2. The combination as defined in claim 1 wherein said means to illuminate one or more but not all of said plurality of fluorescent lights includes a plurality of high frequency responsive ballasts equal in number to the number of said plurality of fluorescent lights that are to be illuminated by said emergency power supply, a different one of said plurality of high frequency ballasts being connected across said ballast of each one of said plurality of fluorescent lights that is to be illuminated by said emergency power supply.

3. The combination as defined in claim 2 wherein a separate high frequency disconnect circuit is connected between said ballast of each one of said plurality of fluorescent lights that is not to be illuminated by said emergency power supply and said "on-off" switch, each one of said separate high frequency disconnect circuits ensuring that its respective one of said plurality of fluorescent lights is not illuminated by said emergency power supply.

4. The combination as defined in claim 3 wherein said emergency power supply comprises at least one battery and an inverter connected between said at least one battery and said second contact of said transfer switch.

5. The combination as defined in claim 4 wherein a plurality of incandescent lights are also coupled to said switch arm through said "on-off" switch.

6. The combination as defined in claim 5 wherein means are provided to hold a selected number of said incandescent lights off when said switch arm is closed on said second contact whereby only a selected number of said incandescent lights will be illuminated by said emergency power supply.

7. The combination as defined in claim 6 wherein said means to hold off a selected number of said incandescent lights comprises separate high frequency disconnect circuits, said high frequency disconnect circuits being connected such that a different one of said high frequency disconnect circuits is connected between said "on-off" switch and each one of said incandescent lights that are to be held off.

8. In combination with a lighting system comprising an alternating current utility power source, an "on-off" switch and a plurality of incandescent lights coupled to a utility power source through said "on-off" switch, an emergency system comprising:

an emergency power supply having a frequency higher than the frequency of said utility power source;

a transfer switch having a first contact directly coupled to said utility power source, a second contact connected to said emergency power supply and a switch arm connected to said "on-off" switch, said transfer switch being so arranged that said switch arm is closed on said first contact when power is available from said utility power source and is automatically transferred from said contact to said second contact when power is not available from said utility power source whereby power for illuminating said plurality incandescent lights is provided by said emergency power supply through said "on-off" switch when power is not available from said utility power source; and means for holding off a selected number of said plurality of incandescent lights when said switch arm is closed on said second contact of said transfer switch whereby one or more but not all of said plurality of incandescent lights are illuminated when power is not available from said utility power source.

9. The combination as defined in claim 8 wherein said means for holding off a selected number of said incandescent lights comprises a high frequency disconnect circuit connected between each said incandescent light that is to be held off and said "on-off" switch, one said high frequency disconnect circuit being provided for each said incandescent light that is to be held off whereby the number of said high frequency disconnect circuits provided is equal to the number of said incandescent lights that are to be held off.

10. The combination as defined in claim 9 wherein said power supply comprises at least one battery and an inverter connected between said battery and said second contact.

* * * * *